(12) United States Patent
Stepień et al.

(10) Patent No.: US 8,658,058 B2
(45) Date of Patent: Feb. 25, 2014

(54) LIQUID-CRYSTAL EMULSION OIL IN WATER TYPE AND A PREPARATION METHOD OF THE LIQUID-CRYSTAL EMULSION

(75) Inventors: Jacek Bernard Stepień, Warszawa (PL); Henryk Jaremek, Warszawa (PL); Grzegorz Franciszek Pielak, Serock (PL)

(73) Assignee: Braster SA, Warszawa (PL)

( * ) Notice: Subject to any disclaimer, the term of this patent is extended or adjusted under 35 U.S.C. 154(b) by 0 days.

(21) Appl. No.: 13/575,881

(22) PCT Filed: Jan. 28, 2011

(86) PCT No.: PCT/PL2011/050004
§ 371 (c)(1),
(2), (4) Date: Jul. 27, 2012

(87) PCT Pub. No.: WO2011/093733
PCT Pub. Date: Aug. 4, 2011

(65) Prior Publication Data
US 2012/0319043 A1      Dec. 20, 2012

(30) Foreign Application Priority Data
Jan. 29, 2010   (PL) .......................... 390319

(51) Int. Cl.
| C09K 19/52 | (2006.01) |
| C09K 19/54 | (2006.01) |
| C09K 19/22 | (2006.01) |
| C09K 19/36 | (2006.01) |
| B01F 3/08 | (2006.01) |
| B01F 3/10 | (2006.01) |

(52) U.S. Cl.
USPC .............. 252/299.01; 252/299.5; 252/299.68; 252/299.7; 516/31; 516/53

(58) Field of Classification Search
USPC .................. 252/299.01, 299.5, 299.68, 299.7; 516/31, 53
See application file for complete search history.

(56) References Cited

U.S. PATENT DOCUMENTS

| 4,441,508 A | 4/1984 | Buirley et al. |
| 4,992,201 A | 2/1991 | Pearlman |
| 2012/0298918 A1* | 11/2012 | Stepien et al. ........... 252/299.68 |

FOREIGN PATENT DOCUMENTS

| GB | 1317450 A | 5/1973 |
| GB | 1322809 A | 7/1973 |
| JP | 60047093 A | 3/1985 |

OTHER PUBLICATIONS

International Search Report and Written Opinion dated May 9, 2011 from corresponding International Patent Application No. PCT/PL2011/050004—10 pages.

* cited by examiner

*Primary Examiner* — Shean C Wu
(74) *Attorney, Agent, or Firm* — Maier & Maier, PLLC

(57) ABSTRACT

The present invention relates to liquid-crystal emulsion for the use in a thermo-optical matrix to an early diagnosis of mammary gland neoplasmic lesions. It contains a mixture of thermotropic liquid crystals and polyvinyl alcohol. The liquid-crystal emulsion contains 14 to 48% by weight (on a dry matter basis) of the thermotropic compounds mixture and 50 to 86% by weight (on a dry matter basis) of polyvinyl alcohol. The present invention also relates to a method for preparing liquid-crystal emulsion.

22 Claims, No Drawings

LIQUID-CRYSTAL EMULSION OIL IN WATER TYPE AND A PREPARATION METHOD OF THE LIQUID-CRYSTAL EMULSION

RELATED APPLICATIONS

This is the U.S. national stage application which claims priority under 35 U.S.C. §371 to International Patent Application No.: PCT/PL2011/050004, filed Jan. 28, 2011, which claims priority to Polish Patent Application No. PL390319, Jan. 29, 2010, the disclosures of which are incorporated by reference herein their entireties.

A present invention relates to the emulsion of a thermotropic liquid crystals mixture in aqueous solution of polyvinyl alcohol (PAW) and the method for preparing this emulsion.

The thermotropic liquid crystals belong to a group of liquid crystals, that pass to the liquid-crystal phase during solid crystals heating, called as thermotropic mesophase, in which the crystals instead of melting to a conventional liquid, pass to the mesophase state at certain determined temperature, and isotropisation of the mesophase occurs only at higher temperature, that is a change of the liquid crystals into isotropic liquid. Dependently on the liquid crystal, it may pass through the different mesophases during reducing the temperature. Thermotropic liquid crystals are characterised by the thermooptical properties, based on the colour change effect of the light reflected by the mesophase, dependently on the temperature thereof.

From the patent specifications from the 1970s are known the emulsions, wherein the aqueous solutions of polyvinyl alcohol, which contained from 5 to 10% of formaldehyde, were used as a continuous phase. The emulsions according to these specifications were not suitable to the industrial applications due to low stability and strong and unpleasant odour release, both in the emulsification process and their storage, and the most importantly, their application on the large surfaces. The emulsification process required to use homogenizers with rotation speed above 12000 l/min and their cooling system. As a result of the problems with achieving (using said method) repeatable emulsion, in respect of significant thermooptical requirements, it was abandoned to use this method in the industrial processes.

Presently applied method of encapsulation is the microencapsulation process. The microencapsulation of the thermotropic liquid crystals, that is valid in the technical and advertising applications, is not appropriate as the encapsulation method for medical applications, demanding for the field of observation of the thermographed surface assurance of optical continuity adjusted to optical resolution of coloured images registering, by means of human eye. The absence of the optical continuity results from dimensions and packing density of "capsules", with regard for a thickness of walls surrounding liquid-crystal aggregates (macroparticles) and is a disadvantage in case of medical applications, in particular applications in matrices to an early diagnosis of a breast cancer in women. That is why, there is a demand for a development the novel liquid-crystal emulsions and the methods for their preparation.

It is an object of the present invention to provide a liquid-crystal composition in a form of a thermooptically stable emulsion that does not release the unpleasant odour and is sufficiently stable from the point of view of a technological process for production of the thermooptical liquid-crystal matrices demands, and the method for the preparation of such composition. Moreover, such emulsion should be easy to prepare and should be characterised by repeatability and stability of parameters over time, such as viscosity and related to it average dimensions of the disperse phase aggregates.

It was found that demanded parameters, concerning "processing" conditions and physicochemical parameters of the liquid-crystal emulsion are possible to obtain by using for the continuous phase preparation appropriate, with regard for molecular weight and degree of hydrolysis, polyvinyl alcohol, in the form of water-acetone-alcohol solution containing from 5 to 20% by weight PAW, from 0.1 to 1.0% boric acid and from 1 to 2% nonoxynol-5 (ethoxylated nonylphenol, a product of addition about 5 molecules ethylene oxide to nonylphenol). The disperse phase content in relation to the continuous phase, on a dry matter basis, should be contained in a range from 14 to 48% by weight. Moreover it was found that easiness and repeatability of formation of the stable emulsion is strongly dependent on the conditions and conditioning time of the continuous phase solution.

Polyvinyl alcohol particularly convenient for the use according to the present invention has the molecular weight from 50000 to 130000 and degree of hydrolysis from 83% to 98 molar %. The emulsion according to the present invention will conveniently contain from 4 to 19% polyvinyl alcohol by weight. It is believed that the main function of polyvinyl alcohol in the emulsion, in combination with small amount, preferably from 1 to 2% by weight, of surfactant (nonoxynol-5) as a dispersing agent, is to act as a thickening agent. The function of polyvinyl alcohol in the phase after emulsion application, is in turn to act as a film-forming agent and partially encapsulating agent.

For the purposes of the application in the matrices to early diagnosis of breast cancer in women, the drop size of the oil phase (liquid-crystal phase) conveniently should be lesser than 5 μm, preferably lesser than 4 μm, and particularly preferably the drop size should be from 1 to 2 μm. Whereas, the emulsion viscosity conveniently should not be larger than 5000 mPa·s and preferably should be lesser than 4500 mPa·s. Particularly preferably the emulsions should have viscosity from 4000 to 4500 mPa·s.

Unexpectedly it was found that by using the emulsion composition according to the present invention and the method of their preparation, the liquid-crystal emulsion that meets the mentioned above requirements concerning the parameters such as the drop size of the oil phase and the emulsion viscosity is obtained.

The present invention relates also to the method for preparing liquid-crystal emulsion. The emulsion according to the present invention is conveniently prepared by vigorous pouring out the mixture of the thermotropic liquid crystals (oil phase), at the temperature near to the temperature of the transfer from the mesophase to the isotropic phase, to the aqueous phase containing polyvinyl alcohol, water, ethyl alcohol, acetone, emulsifying agent and boric acid, at the temperature conveniently lower by 5 to 10° C. from the temperature of the oil phase. Mixing conveniently is carried out using the stirrer with the rotation speed from 500 to 5000 l/min. In order to obtain the droplets of the liquid-crystal aggregates with demanded size, pre-emulsion mass conveniently is mixed for 1 to 15 minutes. After cooling down to the room temperature the emulsion should be stored in a hermetically closed vessel, in a place not exposed to the direct action of sunlight. The emulsion is conveniently utilized during 1 to 10 days, preferably during 2 to 8 days, the most preferably during 4 to 6 days.

In order to obtain the aqueous phase, polyvinyl alcohol is added to the aqueous-alcoholic solution containing dissolved boric acid, preferably at the temperature 22±2° C. The mixture is mixed until good dispersion of polyvinyl alcohol is obtained. Then, the temperature of the mixture, while continuously mixing, is rising to about 80 to 85° C. and the mixture is maintained at this temperature until polyvinyl alcohol is completely dissolved. Next, the solution is cooled down to the temperature of 40° C., acetone and emulsifying agent are added and the whole is mixed to complete mass homogenisation. After cooling down to the room temperature the obtained mass is passed through the sieve of a number 29T, then it is transferred to the hermetically closed containers and placed in a room at the temperature not lower than 20° C., conveniently for 10 to 15 days, preferably for 15 to 30 days, and the most preferably for 30 to 60 days.

Raw Materials Used In Preparation of Emulsion And the Properties of Composition

Oil Phase

Composition: the mixture of thermotropic liquid crystals with the mesophase range, being a function of, among other things, a purity of the mixture constituent compounds, preferably in the temperature range from 22.0° C. to 48.0° C., containing: cholesteryl pelargonate, cholesteryl oleyl carbonate, cholesteryl propionate, cholesteryl chloride and 4,4'-dipentylazoxybenzene in appropriate ratios by weight.

Properties: any range of thermooptical sensitivity (colour response) in visible spectrum range for indicated mesophase range; density at the temperature of 25° C. preferably is 0.98 g/cm$^3$; and viscosity at the temperature of 25° C. preferably is from 75 to 93 mPa·s.

Aqueous Phase

Composition: demineralised water with conductivity preferably lower than 10 μS; acetone preferably analytically pure; anhydrous ethyl alcohol; boric acid preferably analytically pure, nonoxynol-5 preferably with a water content lower than 1%.

Properties: homogenous, transparent mass with stabilised rheological parameters, in the form of polyvinyl alcohol solution in solvents with a density measured at the temperature of 25° C. preferably of 1.004 g/cm$^3$ and viscosity preferably of 6300 mPa·s.

Physical properties of individual phases and final liquid-crystal emulsion were measured using the following measuring apparatus. Density was measured with a pycnometer from Zehner S/N. Viscosity was measured using a viscosimeter Brookfield RVT type. To measure the drop size of the oil phase in the emulsion, a photon correlation spectroscope (Zeta—Master 4, from Malvern, equipped with He—Ne laser of a power of 5 milliwatts) was used. The drop size was also confirmed in a finished product, by testing a cross-section of a film containing applied layer of emulsion by using scanning electron microscope BS-301/Tesla type.

Example 1

Preparation of the Aqueous Phase (Continuous Phase)

28.2 g of polyvinyl alcohol was added to the solution containing 90.5 g of demineralised water, 75.2 g of ethyl alcohol and 1.18 g of boric acid at the temperature of 22±2° C. The mixture was mixed using the mechanical stirrer RD 50D type to obtain good dispersion of polyvinyl alcohol, then still mixing the temperature of the mixture was raised to about 80 to 85° C. and the mixture was maintained at this temperature until polyvinyl alcohol was completely dissolved. Next, the solution was cooled down to the temperature of 40° C. and 37.6 g of acetone and 2.35 g of nonoxynol-5 was added and obtained mixture was mixed to homogenous mass (235 g). After cooling to the room temperature, the obtained mass was passed through the sieve of a number 29T, transferred to the hermetically closed containers and placed in a room at the temperature of about 20° C. for 22 days.

Preparation of the Oil Phase (Disperse Phase)

Cholesteryl pelargonate, cholesteryl oleyl carbonate, cholesteryl propionate, cholesteryl chloride and 4,4'-dipentylazoxybenzene was mixed in appropriate ratios by weight at the temperature of about 70° C., to obtain 15 g of the oil phase.

Preparation of the Liquid-Crystal Emulsion

The mixture of the thermotropic liquid crystals (oil phase, 15 g) was vigorously poured into the aqueous phase (continuous phase, 235 g) at the temperature about 60° C. The whole was mixed using the mechanical stirrer RD 50D type with the rotation speed of 680 l/min. for 7 minutes to obtain 250 g of the liquid-crystal emulsion of a white colour, viscosity of 4200 mPa·s at the temperature of 25° C., density of 1.002 g/cm$^3$ at the temperature of 25° C. and the average drop size of the oil phase of 3.1 μm.

Example 2

The liquid-crystal emulsion was prepared by following the procedure as described in Example 1, using the components in amounts given in Table 1.

TABLE 1

| Component | Contents (g) |
| --- | --- |
| Polyvinyl alcohol | 6.0 |
| Demineralised water | 40.4 |
| Ethyl alcohol | 35.0 |
| Boric acid | 0.1 |
| Acetone | 18.0 |
| Nonoxynol-5 | 1.5 |
| Mixture of thermotropic liquid crystals | 2.0 |

As a result, the liquid-crystal emulsion of a white colour, viscosity of 4250 mPa·s at the temperature of 25° C., density of 1.003 g/cm$^3$ at the temperature of 25° C. and the average drop size of the oil phase of 2.8 μm was obtained.

Example 3

The liquid-crystal emulsion was prepared by following the procedure as described in Example 1, using the components in amounts given in Table 2.

TABLE 2

| Component | Contents (g) |
| --- | --- |
| Polyvinyl alcohol | 19.0 |
| Demineralised water | 34.6 |
| Ethyl alcohol | 29.0 |
| Boric acid | 0.9 |
| Acetone | 14.5 |
| Nonoxynol-5 | 2.0 |
| Mixture of thermotropic liquid crystals | 5.0 |

As a result, the liquid-crystal emulsion of a white colour, viscosity of 4350 mPa·s at the temperature of 25° C., density of 1.005 g/cm$^3$ at the temperature of 25° C. and the average drop size of the oil phase of 2.4 μm was obtained.

The invention claimed is:
1. A liquid-crystal emulsion oil in water type, wherein it comprises of:
   a) a continuous phase (aqueous phase) containing water, ethyl alcohol, acetone, polyvinyl alcohol, dispersing agent and boric acid, b) a disperse phase (oil phase) containing the mixture of the thermotropic liquid crystals.

2. The liquid-crystal emulsion according to claim 1, wherein it comprises the continuous phase containing polyvinyl alcohol in amount from 5 to 20% by weight.

3. The liquid-crystal emulsion according to claim 1, wherein it comprises the continuous phase containing dispersing agent in amount from 1 to 2% by weight.

4. The liquid-crystal emulsion according to claim 1, wherein it comprises the continuous phase containing boric acid in amount from 0.1% to 1.0% by weight.

5. The liquid-crystal emulsion according to claim 1, wherein it comprises 14 to 48% by weight (on a dry matter basis) of the thermotropic liquid crystals mixture and 50 to 86% by weight (on a dry matter basis) of polyvinyl alcohol.

6. The liquid-crystal emulsion according to claim 1, wherein it comprises polyvinyl alcohol of a molecular weight from 50000 to 130000 and hydrolysis degree of 83 to 98 molar %.

7. The liquid-crystal emulsion according to claim 1, wherein it comprises the mixture of the thermotropic liquid crystals selected from the group consisting cholesteryl pelargonate, cholesteryl oleyl carbonate, cholesteryl propionate, cholesteryl chloride and 4,4'-dipentylazoxybenzene.

8. The liquid-crystal emulsion according to claim 1, wherein it comprises nonoxynol-5 as the dispersing agent.

9. The liquid-crystal emulsion according to claim 1, wherein the drop size of the oil phase (liquid-crystal phase) is lesser than 5 μm.

10. The liquid-crystal emulsion according to claim 1, wherein the drop size of the oil phase (liquid-crystal phase) is lesser than 4 μm.

11. The liquid-crystal emulsion according to claim 1, wherein the drop size of the oil phase (liquid-crystal phase) is from 1 to 2 μm.

12. The liquid-crystal emulsion according to claim 1, wherein the emulsion viscosity is lesser than 5000 mPa·s.

13. The liquid-crystal emulsion according to claim 1, wherein the emulsion viscosity is lesser than 4500 mPa·s.

14. The liquid-crystal emulsion according to claim 1, wherein the emulsion viscosity is from 4000 to 4500 mPa·s.

15. A method for preparing liquid-crystal emulsion, wherein it comprises steps of:
   a) preparation of oil phase by mixing the thermotropic liquid crystals;
   b) preparation of aqueous phase by adding polyvinyl alcohol to the aqueous-alcoholic solution containing dissolved boric acid, and mixing and heating the mixture until polyvinyl alcohol is completely dissolved, then obtained solution is cooled down, acetone and emulsifying agent is added and the whole is mixed to obtain homogenous mass, after cooling to the room temperature the obtained mass is passed through the sieve of a number 29T, and it is transferred to the hermetically closed containers and placed in a room at the temperature not lower than 20° C. for 10 to 60 days;
   c) the mixture of the thermotropic liquid crystals is vigorously poured into the aqueous phase and the whole is mixed using the stirrer with a rotation speed from 500 to 5000 l/min for 1 to 15 minutes to obtain the liquid-crystal emulsion.

16. The method according to claim 15, wherein in step b) the mixture is heated to a temperature of about 80 to 85° C.

17. The method according to claim 15, wherein in step b) obtained solution is cooled down to a temperature of 40° C.

18. The method according to claim 15, wherein step c) the mixture of the thermotropic liquid crystals is poured into the aqueous phase at the temperature about 60 to 65° C.

19. The method according to claim 15, wherein the aqueous phase is conditioned for 10 to 15 days before it is used in the emulsification process.

20. The method according to claim 15, wherein the aqueous phase is conditioned for 15 to 30 days before it is used in the emulsification process.

21. The method according to claim 15, wherein the aqueous phase is conditioned for 30 to 60 days before it is used in the emulsification process.

22. The method according to claim 15, wherein for stirring of the aqueous phase and the oil phase, a slow-rotating stirrer is used.

\* \* \* \* \*